(12) United States Patent
Greve et al.

(10) Patent No.: US 11,360,476 B1
(45) Date of Patent: Jun. 14, 2022

(54) SYSTEMS AND METHODS FOR MONITORING AIRCRAFT CONTROL SYSTEMS USING ARTIFICIAL INTELLIGENCE

(71) Applicant: Rockwell Collins, Inc., Cedar Rapids, IA (US)

(72) Inventors: David A. Greve, Cedar Rapids, IA (US); Ryan J. Coppa, Cedar Rapids, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 577 days.

(21) Appl. No.: 16/239,439

(22) Filed: Jan. 3, 2019

(51) Int. Cl.
| | | |
|---|---|---|
| *G06N 3/08* | (2006.01) | |
| *B64D 43/00* | (2006.01) | |
| *G05D 1/00* | (2006.01) | |
| *G05D 1/10* | (2006.01) | |
| *G06N 3/04* | (2006.01) | |

(52) U.S. Cl.
CPC ........... *G05D 1/0088* (2013.01); *B64D 43/00* (2013.01); *G05D 1/101* (2013.01); *G06N 3/0454* (2013.01); *G06N 3/08* (2013.01)

(58) Field of Classification Search
CPC ........ G05D 1/0088; G05D 1/101; G06N 3/08; G06N 3/0454; B64D 43/00
See application file for complete search history.

(56) References Cited

U.S. PATENT DOCUMENTS 10,802,489 B1 * 10/2020 Abeloe ................ G05D 1/0221
2018/0204111 A1 * 7/2018 Zadeh .................. G06K 9/3233

OTHER PUBLICATIONS

"Reluplex: An Efficient SMT Solver for Verifying Deep Neural Networks" by Katz et al. May 19, 2017.

* cited by examiner

*Primary Examiner* — Mathew Franklin Gordon
(74) *Attorney, Agent, or Firm* — Suiter Swantz pc llo (57) ABSTRACT

The system includes a sensor interface for receiving sensor inputs, a first neural network configured to receive the sensor inputs and provide control signals for controlling the vehicle, and a second neural network configured to receive control signals and provide monitor signals. The system also includes a monitor configured to receive the sensor inputs and the monitor signals and provide a first signal related a proper operation of the first neural network.

19 Claims, 8 Drawing Sheets

SYSTEMS AND METHODS FOR MONITORING AIRCRAFT CONTROL SYSTEMS USING ARTIFICIAL INTELLIGENCE

BACKGROUND

The inventive concepts disclosed herein relate generally to the field of vehicle systems. More particularly, embodiments of the inventive concepts disclosed herein relate to systems and methods for vehicle control systems based at least in part upon artificial intelligence, including but not limited to neural networks, machine learning, and other autonomous configurations.

Manned vehicles and autonomous vehicles, including manned and unmanned aircraft, can perform maneuvers based on instructions that may be received from a remote human operator or, in the case of fully autonomous vehicles, instructions that are generated based on control laws that may be based on optimizing a particular objective. Artificial intelligence has been proposed for use in vehicle control systems for manned and autonomous vehicles. Ensuring that the artificial intelligence in vehicle control systems, especially critical control systems, is operating properly is desired.

SUMMARY

In one aspect, the inventive concepts disclosed herein are directed to a system for controlling a vehicle. The system includes a sensor interface for receiving sensor inputs, a first neural network configured to receive the sensor inputs and provide control signals for controlling the vehicle, and a second neural network configured to receive control signals and provide monitor signals. The system also includes a monitor configured to receive the sensor inputs and the monitor signals and provide a first signal related a proper operation of the first neural network.

In a further aspect, the inventive concepts disclosed herein are directed to a vehicle. The vehicle includes a first interface configured to receive an input condition, a second interface configured to receive a control instruction, and a control circuit. The control circuit includes a first neural network configured to receive the input condition and provide the control instruction for controlling the vehicle, a second neural network configured to receive control instruction and provide a monitor condition, and a monitor configured to provide a first signal related a proper operation of the first neural network in response to the monitor signal or second signal provided in response to the monitor signal.

In a further aspect, the inventive concepts disclosed herein are directed to a method of training a neural network-based a vehicle control system. The method includes providing input data to a first neural network to configure the first neural network to provide output data for vehicle control in response to input data. The method also includes providing the output data to a second neural network. The method also includes providing monitor data from the second neural network. The monitor data is provided by the second neural network in response to the output data. The method also includes configuring the second neural network to be an inverse of the first neural network using the input data and the monitor data.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Further, unless expressly stated to the contrary, "or" refers to an inclusive or and not to an exclusive or. For example, a condition A or B is satisfied by any one of the following:

A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

The inventive concepts disclosed herein can be utilized in a number of control systems for various types of electronically controlled or assisted vehicle applications (e.g., avionics applications for airborne platforms (e.g., aircraft), including but not limited to flight control and autopilot systems, navigation systems, flight display systems, communications systems, radar systems, electric power systems, engine control systems, and monitor warning systems). While the present disclosure describes systems and methods implementable for an airborne platform, the inventive concepts disclosed herein may be used in any type of application or environment (e.g., in another aircraft, a spacecraft, an autonomous vehicle, a ground-based vehicle, a water-based or underwater vehicle, a subsurface or subterranean vehicle, a satellite, an aeronautical platform, or in a non-vehicle application such as a stationary communications, sensing, or testing system, a ground-based display system, an air traffic control system, a radar system, a virtual display system). The inventive concepts disclosed herein may be used for training, simulation, and testing exercises to be performed with autonomous and manned vehicles, including during development of autonomous or manned vehicles.

In some embodiments, a system includes a machine learning engine. The machine learning engine is configured to receive training data including a plurality of first input conditions and a plurality of first response maneuvers associated with the first input conditions. The machine learning engine is configured to train a learning system using the training data to generate a second response maneuver based on a second input condition.

The system can be integrated with an airborne platform or other platform as described herein. For example, the system can be included in or communicatively coupled to an avionics system, navigation system, or autopilot system of the airborne platform, including for controlling operation of manned vehicles and autonomous vehicles.

In some embodiments, systems and methods provide a vehicle control system that use a neural network and an inverse neural network (e.g., a ten lauren network) to ensure that the control system is operating properly. In some embodiments, the systems and methods do not require and rely on tools such as a Reluplex Satisfiability Modulo Theories (SMT) solvers to verify properties of neural networks. Such tools can be slow and limited to those networks which utilized the rectified linear unit activation function. In addition, the analysis of such tools must often be performed offline and is limited in completeness to the data available in the training set.

Some embodiments of inventive concepts disclosed herein provide a run-time monitoring system for a neural network-based vehicle control system that employs an additional network that is capable of detecting when the original network encounters a scenario for which is has not been properly trained. In some embodiments, a target network (N) for the vehicle control system is trained, and the additional network, H, is paired with a "frozen" instance of the target neural network, N, such that the outputs of the network H are the inputs of the network N. This configuration allows backpropagation to occur, while only training the network H in some embodiments. The combined network of the network N plus the network H is trained so that, when the combined network is fed the outputs of the original training set, the combined network reproduces those values faithfully on its outputs. The result of this process is that the network H is trained as the inverse of the network N in some embodiments. In some embodiments, the combined network is deployed in the vehicle control system so that an error or potential error (e.g., the network N is not trained for the conditions) is indicated if the input to the network N and the output of the network H disagree. In some embodiments, the combined network is deployed with a second instance of the network N at the output of the network H in the vehicle control system so that an error or potential error is indicated if the input of the network H and the output of the second instance of the network N disagree. The error indicates that a situation has arisen for which network N has not been properly trained in some embodiments.

Figure 1:
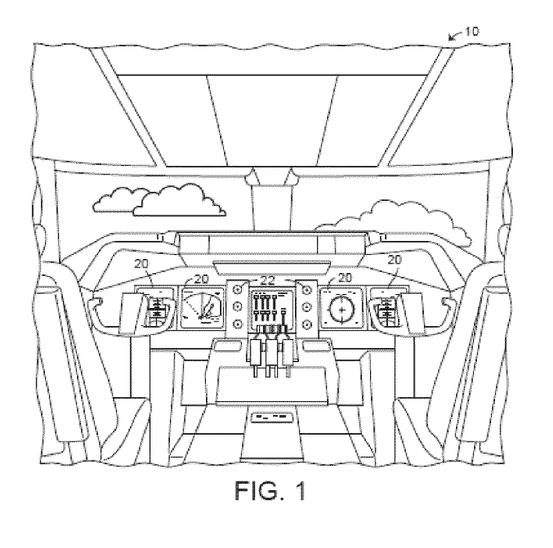
FIG. 1 is a schematic illustration of an exemplary embodiment of an aircraft control center for an aircraft according to the inventive concepts disclosed herein.

Referring to FIG. 1, a perspective view schematic illustration of an aircraft control center or cockpit 10 is shown accordingly to an exemplary embodiment of the inventive concepts disclosed herein. The cockpit 10 can be configured for an aircraft operator, a control system, or other user to interact with avionics systems of an airborne platform. The cockpit 10 may include one or more flight displays 20 and one or more user interface ("UI") elements 22. According to various exemplary embodiments of the inventive concepts disclosed herein, at least one of the flight displays 20 may be configured to display a visual representation of a widget generated according to the systems and methods of the inventive concepts disclosed herein.

In some embodiments, the flight displays 20 may provide an output based on data received from a system external to an aircraft, such as a ground-based weather radar system, satellite-based system, or from a system of another aircraft. In some embodiments, the flight displays 20 may provide an output from an onboard aircraft-based weather radar system, LIDAR system, infrared system or other system on an aircraft. For example, the flight displays 20 may include a weather display, a weather radar map, and a terrain display. In some embodiments, the flight displays 20 may provide an output based on a combination of data received from multiple external systems or from at least one external system and an onboard aircraft-based system. The flight displays 20 may include an electronic display or a synthetic vision system (SVS).

In some embodiments, such as where an autonomous vehicle includes the cockpit 10, the cockpit 10 may be used to implement the autonomous vehicle as a piloted vehicle, or the autonomous vehicle components may be used as a backup system if the piloted portion of the vehicle is degraded or disabled. In some embodiments, such as for a hardware-in-the-loop test in which autonomous vehicle hardware is configured to display test information and receive inputs from a pilot or other user via components of the cockpit 10. In some embodiments, the cockpit includes less equipment than is shown in FIG. 1 and includes a computer or network for hosting a vehicle control system.

Figure 2:
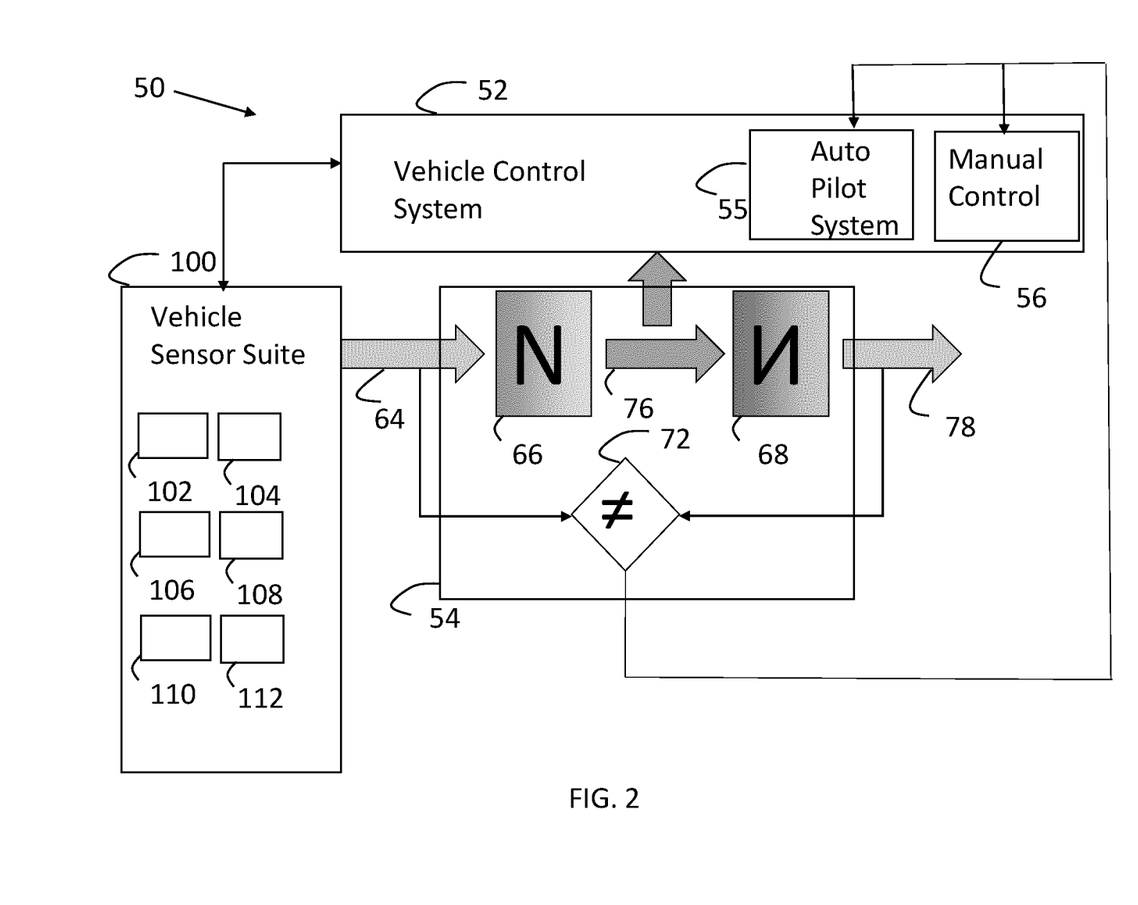
FIG. 2 is a block diagram of an exemplary embodiment of an aircraft control system for the aircraft control center illustrated in FIG. 1 according to the inventive concepts disclosed herein.

Referring now to FIG. 2, a schematic diagram of a control system 50 is shown according to some embodiments of the inventive concepts disclosed herein. The control system 50 can be implemented as part of a vehicle, an autonomous vehicle, or any other platform, such as an airborne platform incorporating features of the aircraft control center or cockpit 10 of FIG. 1. The control system 50 (or components thereof) can be implemented on a live platform, a simulation of a platform, a test exercise, or a hardware-in-the-loop application.

In some embodiments, the control system 50 includes a vehicle control system 52, an artificial intelligence based control system 54, and a suite of sensors 100 (e.g., aircraft sensors). The control system 52 is an aircraft control system configured to control flight control surfaces of an aircraft and includes an autopilot system 55 and a manual control system 56. The control system 50 is coupled with the suite of sensors 100 and the displays 20 and UI elements 22 of FIG. 1 in some embodiments. The vehicle control system 52 includes manual and automatic control mechanisms for engines, control surfaces (e.g., rudder, ailerons, flaps, and elevators), landing gear, brakes, throttles, steering, lights, radios, the sensors 100 and other vehicle equipment. The vehicle control system 52 includes interfaces and circuitry for providing control signals to the manual and automatic control mechanisms in response to sensed parameters from the sensors 100, user inputs, and computer generated instructions.

In some embodiments, the autopilot system 55 controls the trajectory of an aircraft without constant 'hands-on' control by a human operator and can include an auto throttle for controlling the power delivered by the engines. In some embodiments, the autopilot system 55 can follow control laws and pilot the aircraft according to a flight plan using inertial reference system (IRS) or global positioning system sensed position. The manual control system 56 interfaces with the autopilot system and includes levers, servos, actuators, pneumatic devices, electro-mechanical devices for implementing control of the vehicle and receiving manually input flight control commands.

In some embodiments, the vehicle control system 52 includes or is coupled to a supervisory controller in some embodiments. The supervisory controller can be configured to synthesize control instructions generated by a maneuver controller or other controller. The other controllers can be a control law system, or respond to information received from a navigation system or sensor system (e.g., aircraft sensor suite of sensors 100).

The sensors 100 include a positioning sensor 102 (e.g., at least one global navigation satellite system (GNSS) receiver, inertial reference system (IRS), an attitude heading and reference system (AHRS)), a flight computer or a flight management system (FMS) 104, a terrain avoidance system 106, a vision system 108 (e.g., an enhanced vision system (EVS)), distance measuring equipment (DME) system, an infra-red camera, a laser sensor, a visible light camera, etc.), flight parameter sensors 110 (e.g., an altimeter, flight speed indicator, vertical speed indicator, roll sensor, pitch sensor, tilt sensor, landing gear sensor, etc., including any combination thereof) and other systems/sensors 112 (e.g., weather radar, targeting radar, landing system equipment, radios, traffic collision avoidance system (TCAS), mode S systems, Automatic Dependent Surveillance-Broadcast (ADS-B), etc. including any combination thereof). The sensors 100 provide information related to the vehicle state, position, travel, travel plan, vehicle environment, etc. used to control the vehicle and are coupled to the artificial intelligence based control system 54.

The artificial intelligence based control system 54 is a control system that has been trained in accordance with artificial intelligence techniques to respond to input criteria 64 from the sensors 100 or form a human operator and provide output criteria 76 for controlling a vehicle. The artificial intelligence based control system 54 is a neural network-based (e.g., an artificial neural network (ANN), deep neural network (DNN), or other machine learning framework) control system in some embodiments. The control system 54 is configured to control a vehicle (e.g., an aircraft) directly or via commands to the control system 52 (e.g., via the autopilot system 55 and/or the manual control system 56). In some embodiments, the control system 54 can generate instructions, commands, control signals, or other information that can be used to control operation of a vehicle (or control systems of a vehicle) directly or through the autopilot system 55 or the manual control system 56.

The artificial intelligence based control system 54 includes a neural network 66, a neural network 68 and a monitor or compare circuit 72. The artificial intelligence based control system 54 and its components are provided on a computing platform including an electronic processor and memory. The computing platform is configured by software to provide the operations as described herein. The neural network 66 is configured for vehicle control according to artificial intelligence training techniques, and the neural network 68 is configured as an inverse neural network of the network 66 (e.g., a ten lauren network) in some embodiments.

The electronic processor can be implemented as a specific purpose processor, an application specific integrated circuit (ASIC), one or more field programmable gate arrays (FPGAs), a group of processing components, or other suitable electronic processing components. The memory is one or more devices (e.g., RAM, ROM, flash memory, hard disk storage) for storing data and computer code for completing and facilitating the various user or client processes, layers, and modules described in the present disclosure. The memory can be or include volatile memory or non-volatile memory and may include database components, object code components, script components, or any other type of information structure for supporting the various activities and information structures of the inventive concepts disclosed herein. The memory is communicably connected to the processor and includes computer code or instruction modules for executing one or more processes described herein. The memory includes various circuits, software engines, and/or modules that cause the processor to execute the systems, networks 66 and 68, and methods described herein. Electronic hardware similar to the processor and memory may also be used to implement various components not shown in FIG. 2.

The neural network 66 responds to the input criteria 64 (sensor information) and provides output criteria 76 used for control of the vehicle. The output criteria 76 is provided to the vehicle control system 52 to control the vehicle in some embodiments. The output criteria 76 is also provided to the neural network 68 which provides output criteria 78 (e.g., monitor data) in response to the output criteria 76. The neural networks 66 and 68 can include a number of layers each including one or more nodes, such as a first layer (e.g., an input layer), a second layer (e.g., an output layer), and one or more hidden layers. The neural networks 66 and 68 can include characteristics such weights and biases associated with computations that can be performed between nodes of layers.

The compare circuit 72 provides a run-time monitoring for the neural networks 66 and 68. The compare circuit 72 compares the input criteria 64 to the neural network 66 to the output criteria 78 (e.g., monitor criteria) of the neural network 68. If the compare circuit 72 determines that the output criteria 78 does not match or disagrees with the input criteria 64, a scenario for which the network 66 has not been properly trained is indicated (e.g., an error). The output of the comparator circuit 72 can then be used as a signal that, for example, selects a simpler but more highly trusted back-up controller (e.g., the autopilot system 55 or the manual control system 56) until the situation normalizes in some embodiments. The autopilot system 55 can be a system that is engaged to maintain the aircraft a certain altitude or a certain altitude above terrain in response to the error and/or call or alarm for pilot intervention in some embodiments. An error can also be indicated on the display 20 (FIG. 1).

Once the neural network 66 is trained, the neural network 68 is paired with a frozen instance of the neural network 66 such that the output criteria of the neural network 68 is the input criteria of the neural network 66. This configuration allows backpropagation to occur, while only training the neural network 68 in some embodiments. This combination of the neural networks 66 and 68 is configured so that when the neural network 68 is fed the output criteria 76 of the original training set, the combination reproduces those values faithfully as the output criteria 78 in some embodiments.

The neural network 66 is trained to control operation of the vehicle in response to an input condition, where the input condition may include at least one of a command received from a human pilot, a state of the vehicle, sensed information, or a state or representation of an environment surrounding the vehicle in some embodiments. The neural network 66 can control a maneuver controller based on historical training data associating input conditions with vehicle responses, such as maneuvers performed by the vehicle responsive to controls from a human pilot. By encoding response maneuvers at an appropriate level, autonomous vehicles can be enabled to communicate with and receive commands from human pilots at a much higher level than in existing systems, such that autonomous vehicles and human pilots can have a shared mental model of vehicle behavior and control in some embodiments. The appropriate maneuver can be similar to a maneuver that would be performed by a human pilot under similar conditions or circumstances.

In some embodiments, the training and use of the networks 66 and 68 reduces mathematical analysis required for the system 50. In some embodiments, the training and use of the networks 66 and 68 allows the use of an extremely large input space with large amounts of sensor information which would be difficult to test with conventional control logic techniques. In some embodiments, the network 68 uses loose mathematical logic to describe system behaviors and J-kind mathematical analysis tools using SMT solvers to do a mathematical analysis of the behavioral descriptions.

Figure 3:
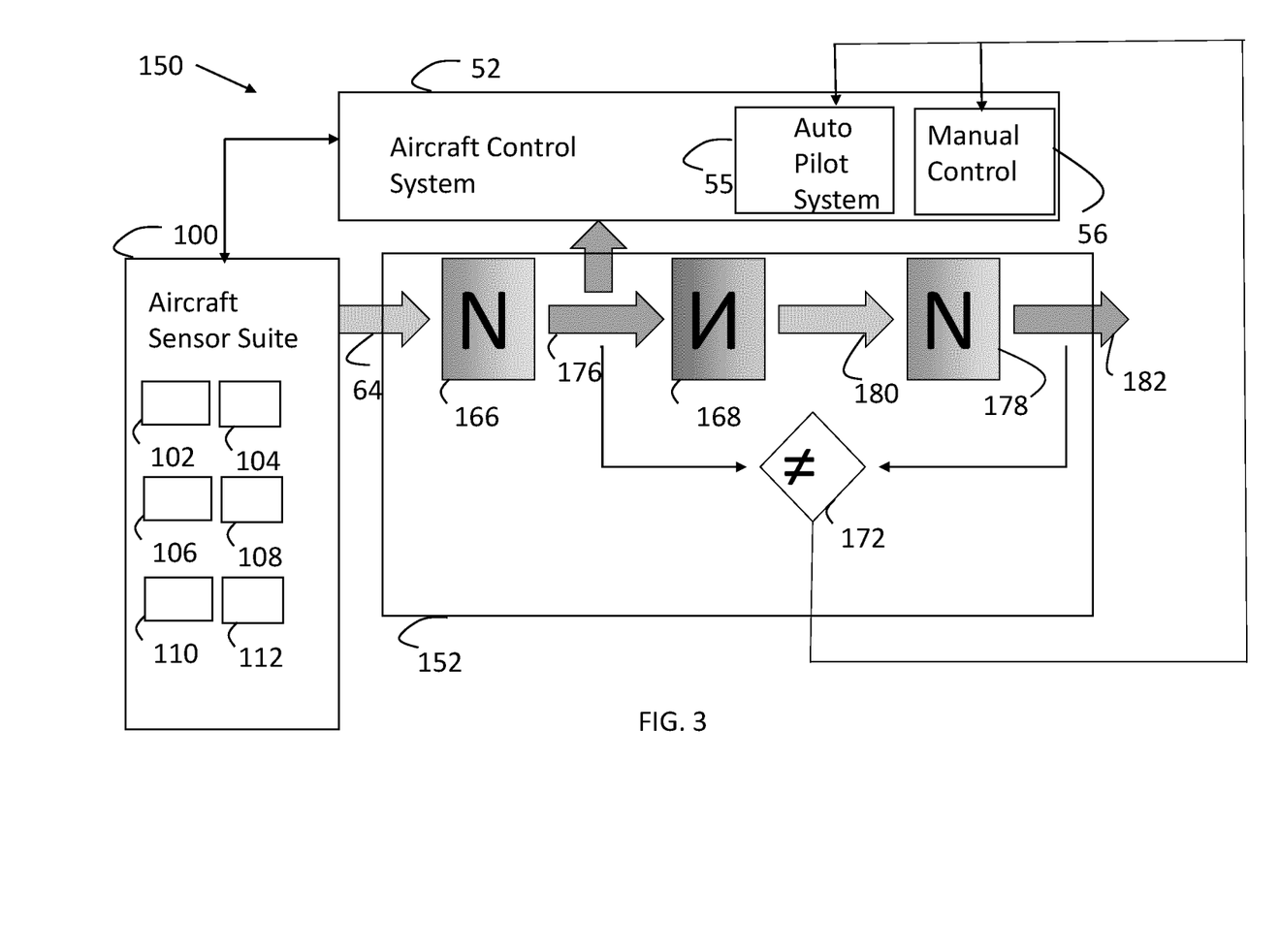
FIG. 3 is a block diagram of another exemplary embodiment of an aircraft control system for the aircraft control center illustrated in FIG. 1 according to the inventive concepts disclosed herein.

Referring now to FIG. 3, a schematic diagram of a control system 150 is shown according to some embodiments of the inventive concepts disclosed herein. The control system 150 is similar to the control system 50 and can be implemented as part of a vehicle, an autonomous vehicle, or any other platform, such as an airborne platform incorporating features of the aircraft control center or cockpit 10 of FIG. 1. The control system 150 (or components thereof) can be implemented on a live platform, a simulation of a platform, a test exercise, or a hardware-in-the-loop application.

In some embodiments, the control system 150 includes the vehicle control system 52, an artificial intelligence based control system 152, and the suite of the sensors 100 (e.g., aircraft sensors). The artificial intelligence based control system 152 is a control system that has been trained in accordance with artificial intelligence techniques to response to the input criteria 64 from the sensors 100 and provides output criteria 176 for controlling a vehicle. The artificial intelligence based control system 152 is a neural network-based (e.g., an artificial neural network (ANN), deep neural network (DNN), or other machine learning framework) control system in some embodiments. The control system 152 is configured to control a vehicle (e.g., an aircraft) directly or via commands to the control system 52 (e.g., via the autopilot system 55 and/or the manual control system 56). In some embodiments, the control system 152 can generate instructions, commands, or other information that can be used to control operation of a vehicle (or control systems of a vehicle) directly or through the autopilot system 55 of the manual control system 56.

The artificial intelligence based control system 152 includes a neural network 166, a neural network 168, a neural network 178 and a monitor or compare circuit 172. The control system 152 and its components are provided on a computing platform including an electronic processor and memory. The computing platform is configured by software to provide the operations as described herein. The neural network 166 is configured for vehicle control according to artificial intelligence training techniques, and the neural network 168 is configured as an inverse neural network (e.g., a ten lauren network) in some embodiments. The neural network 178 is configured as a second instance or copy of the neural network 166.

The neural network 166 responds to the input criteria 64 (sensor information) and provides the output criteria 176 used for control of the vehicle. The output criteria 176 is provided to the vehicle control system 52 to control the vehicle in some embodiments. The output criteria 176 is also provided to the neural network 168 which provides the output criteria 180 in response to the output criteria 176. The output criteria 180 is provided to the neural network 178 which provides the output criteria 182 in response to the output criteria 180. The neural network 168 is paired with a frozen instance of the neural network 166 for training in some embodiments.

The compare circuit 172 provides a run-time monitoring for the neural networks 166, 168 and 178. The compare circuit 72 compares the output criteria 182 from the neural network 178 to the output criteria 176 of the neural network 166. If the compare circuit 172 determines that the output criteria 182 does not match or disagrees with the output criteria 176, a scenario for which the network 166 has not been properly trained is indicated (e.g., an error). The output of the comparator circuit 172 can then be used as a signal to, for example, select a simpler, but more highly trusted control system (e.g., the autopilot system 55 or the manual control system 56) until the situation normalizes in some embodiments. An error can also be indicated on the display 20 (FIG. 1).

Figure 4:
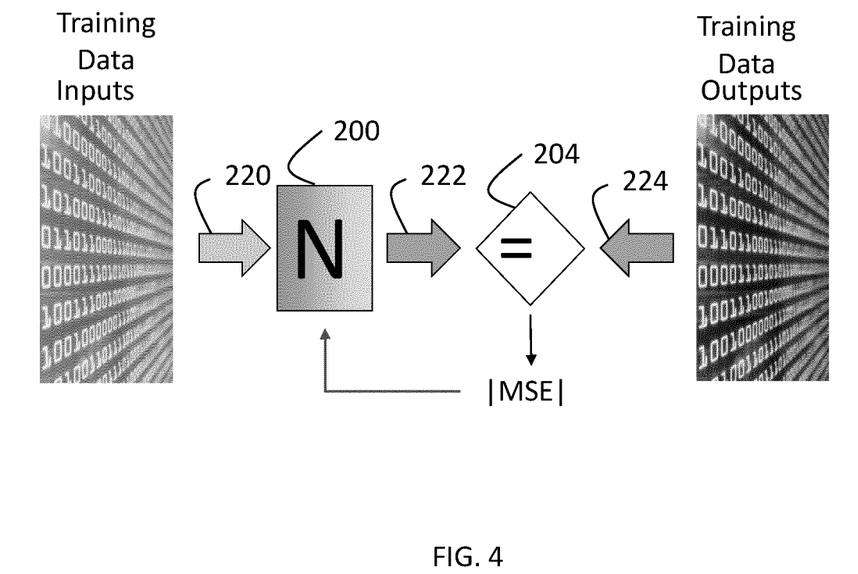
FIG. 4 is a block diagram of an exemplary embodiment of a training system for a neural network used in the aircraft control systems illustrated in FIGS. 2 and 3 according to the inventive concepts disclosed herein.

Referring now to FIG. 4, a neural network 200 is trained using training input data or criteria 220 and training output data or criteria 224. The neural network 200 can be used in the control systems 50 and 150 as the neural network 66 and 166 (FIGS. 2 and 3). The training input criteria 220 and the training output criteria 224 can be known input and output criteria generated from known acceptable aircraft control data bases. The training input criteria 220 and the training output criteria 224 can be developed from observed data, simulated data, or control law generated data. In some embodiments, the training input criteria 220 is based upon data from or associated with the suite of the sensors 100 (FIG. 1).

The training input conditions or criteria 220 can include an entity state. The entity state can include at least one of a position, a velocity, an acceleration, or an orientation. For example, the entity state can include a position and orientation of an airborne platform. In some embodiments, the machine learning engine 208 receives the entity state as data in a format associated with position, velocity, acceleration, or orientation. For example, the entity state data may indicate GPS coordinates of a vehicle, an airspeed or groundspeed of the vehicle, and a heading of the vehicle. In some embodiments, the entity data is in a format that provides position, velocity, acceleration, or orientation. In some embodiments, the input criteria 220 includes weather radar data, EVS data, thrust data, TAWS data, phase of flight, landing guidance data, communication data, and acceleration data.

The entity state can include at least one of absolute information or relative information. For example, the entity state can indicate that the vehicle is located at absolute GPS coordinates. The entity state can indicate that the vehicle has an orientation such that the vehicle is travelling along a particular heading, such as "north." The entity state can also indicate a relative orientation or relative heading of the vehicle relative to a remote vehicle or platform. For example, the entity state can indicate that the vehicle is travelling in a direction that is 15 degrees eastward of a heading or orientation of the remote vehicle or platform.

The training output criteria 224 can include data for controlling aircraft equipment, instructions for aircraft systems, maneuver commands for automated control systems, or control signals. The data, instructions, commands, and signals can be for changing a position, a velocity, an acceleration, or an orientation of a vehicle or for making a maneuver or preparing for a maneuver. The training output criteria 224 includes a radio commands, commands to sensors, and commands to other avionic equipment in some embodiments. In some embodiments, the training output criteria 224 includes maneuver data. The maneuver data can represent a series of entity states over time. For example, the maneuver data can represent positions and/or orientations over the course of a maneuver. The maneuver data can also represent control instructions received from a pilot of the course of a maneuver, such as control instructions received from control devices such as accelerators, brakes, steering wheels, yokes, or other control devices. In some embodiments, the first response maneuvers are based on maneuver data from at least one of a simulation of piloting a vehicle, a control system of a vehicle, or a navigation system of a vehicle.

The training input criteria 220 and the training output criteria 224 can be received from a training database storing the training data. The training database can store training data received based on data captured from control of a vehicle by a human pilot, such as from a simulation of controlling the vehicle or from real flight data. Response maneuvers can be associated in the training database with the training input criteria 220. For example, the training database can map the input criteria 220 to response maneuvers and the response maneuvers to the training output criteria. In some embodiments, more than one first condition can be associated with a particular response maneuver. For example, the particular maneuver may have been performed under a variety of input conditions.

In some embodiments, the training data includes a predetermined (or historical) first input condition and a predetermined (or historical) first response maneuver associated with the predetermined first input condition. For example, the first input condition may be stored as a first data point or set of data, and the first response maneuver stored as a second data point or set of data. In some embodiments, the first input conditions and first response maneuvers may not be distinguished from one another when stored or when received as the training data. For example, training data received based on control of the vehicle by a pilot may be a continuous string of position data, orientation data, and/or control data.

A machine learning engine 204 can be used to configure the neural network 200 in response to the training input criteria 220 and the training output criteria 224. The output criteria 222 provided by the neural network 200 responding to the training input criteria 220 is compared to the training output criteria 224 to configure the neural network 200. A mean square error (MSE) technique is used in some embodiments. The machine learning engine 204 receives the input criteria 220, and modifies a characteristic of the neural network 200 to reduce a difference between the output criteria 222 and the training output criteria 224 in some embodiments.

In some embodiments, the learning engine 204 includes a classification engine, such as a support vector machine (SVM). For example, the machine learning engine 204 can be configured to train the SVM to generate one or more rules configured to classify training pairs (e.g., each first input condition and its corresponding first response maneuver). The rules may include one or more hyperplanes calculated to maximize one or more corresponding margins between the hyperplanes and the training pairs, including margins defined between the hyperplanes and support vectors (e.g., those training pairs closest to the one or more hyperplanes). The classification of training pairs can enable the mapping of first input conditions to first response maneuvers by classifying particular first response maneuvers as corresponding to particular first input conditions.

In some embodiments, the machine learning engine 204 can be configured to train the Markov decision process engine to determine a policy based on the training data, the policy indicating, representing, or resembling how a vehicle would behave while controlled by a human pilot in response to various input conditions. The machine learning engine 204 can provide the first input conditions to the Markov decision process engine as a set or plurality of states (e.g., a set or plurality of finite states). The machine learning engine 208 can provide the first response maneuvers to the Markov decision process as a set or number of actions (e.g., a set or number of finite actions). The machine learning engine 204 can execute the Markov decision process engine to determine the policy that best represents the relationship between the first input conditions and first response maneuvers.

It will be appreciated that in various embodiments, the machine learning system 204 can include various other machine learning engines and algorithms, as well as combinations of machine learning engines and algorithms, that can be executed to determine a relationship between the plurality of first input conditions and the plurality of first response maneuvers and thus train the neural network 200.

Figure 5:
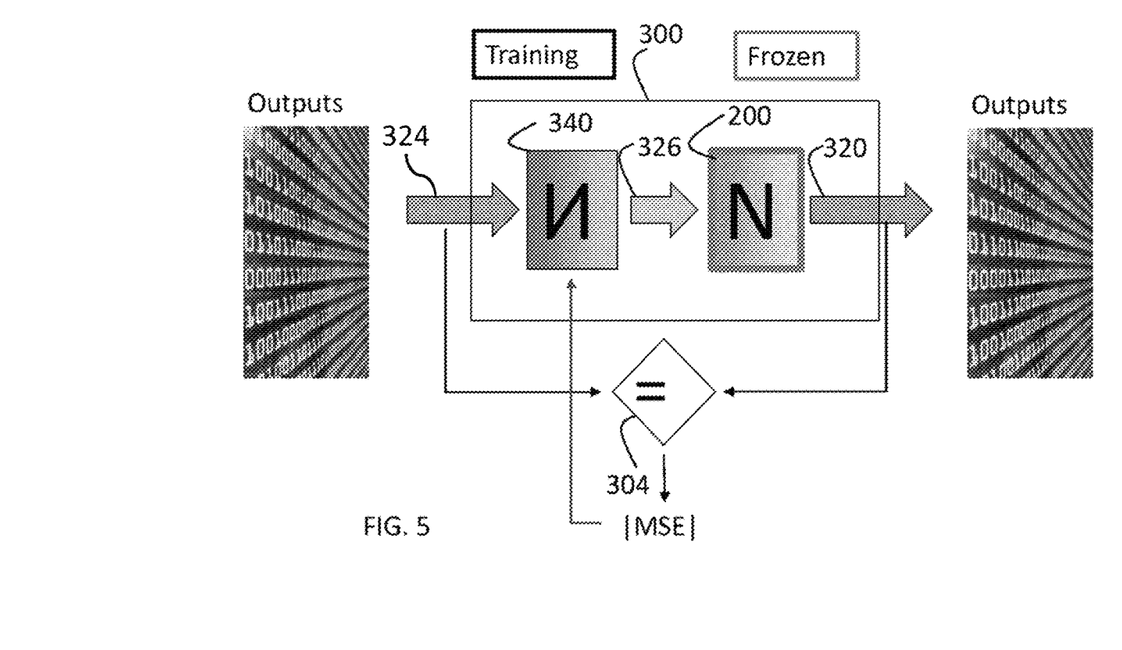
FIG. 5 is a block diagram of an exemplary embodiment of a training system for an inverse neural network used in the aircraft control systems illustrated in FIGS. 2 and 3 according to the inventive concepts disclosed herein.

Referring now to FIG. 5, the neural network 200 is frozen and an inverse neural network 340 is trained using training output criteria 320 and training output criteria 324 The neural network 340 can be used in the control systems 50 and 150 as the neural network 68 and 168 (FIGS. 2 and 3). The training output criteria 320 and the training output criteria 324 can be known the output criteria associated with the output criteria 222 (FIG. 4) after being frozen.

A machine learning engine 304 similar to the machine learning engine 205 can be used to configure the neural network 340 in response to the training output criteria 320 and the training output criteria 324. The training output criteria 320 (e.g. the output criteria 222 in FIG. 4) of the neural network 200 responding to criteria 326 is compared to the training output criteria 324 to configure the neural network 200. The criteria 326 is provided by the neural network 340 in training. A mean square error (MSE) technique can be used to configure the network 340. The machine learning engine 304 can receive the output criteria 320 and 324, and modify a characteristic of the neural network 340 to reduce a difference between the training output criteria 320 and 324.

Figure 6:
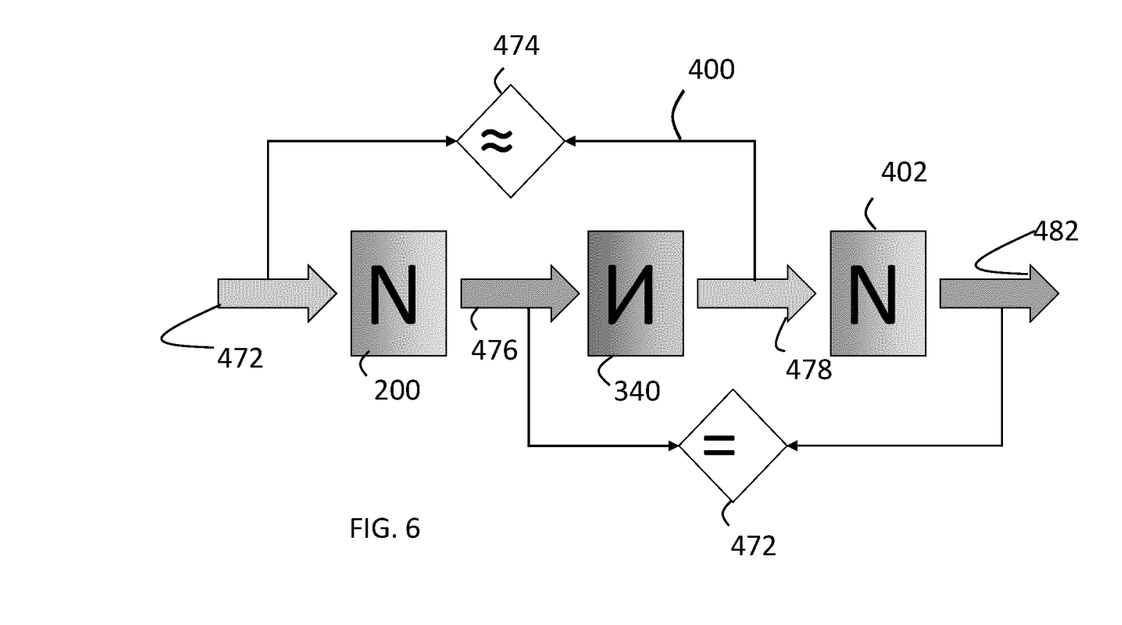
FIG. 6 is a block diagram of an exemplary embodiment of a testing system for the neural network and inverse neural network illustrated in FIGS. 4 and 5 according to the inventive concepts disclosed herein.

Referring now to FIG. 6, a testing system 400 for the neural networks 200 and 340 includes a comparator circuit 472, a comparator circuit 474, and an instance 402 of the neural network 200. The compare circuit 472 compares the output criteria 476 from the neural network 200 to output criteria 482 of the instance 402 of the neural network 200. If the compare circuit 472 determines that the output criteria 482 does not match or disagrees with the output criteria 476, a scenario for which the network 200 has not been properly trained is indicated (e.g., an error). The compare circuit 474 compares the input criteria 476 from the neural network 200 to the input criteria 478 from the neural network 340. If the compare circuit 474 determines that the input criteria 478 does not match or disagrees with the input criteria 478, a scenario for which the network 200 has not been properly trained is indicated (e.g., an error).

Figure 7:
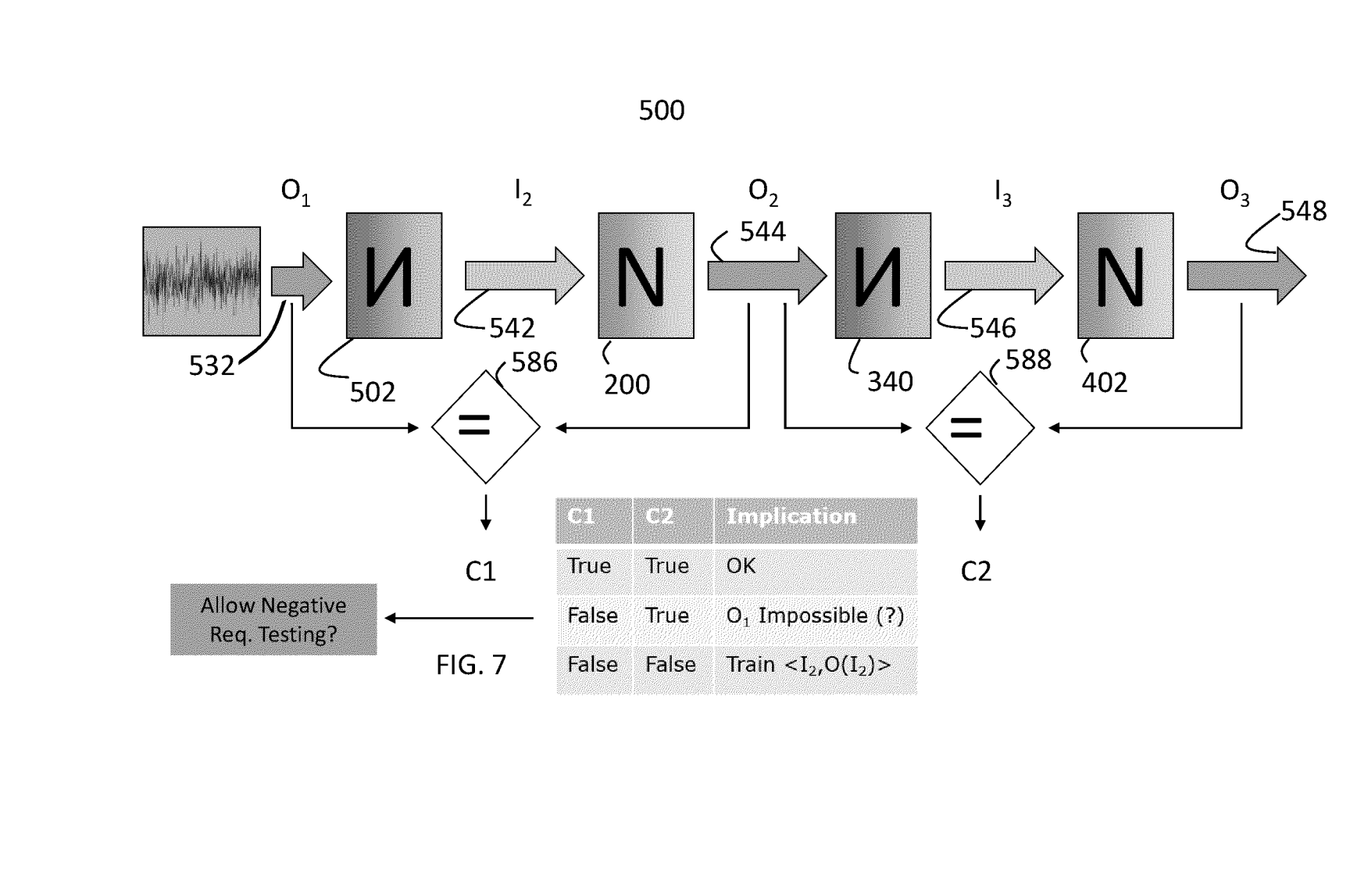
FIG. 7 is a block diagram of another exemplary embodiment of a testing system for the neural network and inverse neural network illustrated in FIGS. 4 and 5 according to the inventive concepts disclosed herein.

Referring now to FIG. 7, a testing system 500 for the neural networks 200 and 340 includes a comparator circuit 586, a comparator circuit 588, the instance 402 of the neural network 200, and a copy or an instance 502 of the neural network 340. The compare circuit 472 compares output criteria 532 provided to the instance 502 to output criteria 544 of the neural network 200. The compare circuit 588 compares the output criteria 544 from the neural network 200 to output criteria 548 of the instance 402 of the neural network 200. If the compare circuits 586 and 588 both detect a match, the neural network 200 is operating properly. If the compare circuit 586 determines that the output criteria 532 does not match or disagrees with the output criteria 544 and the compare circuit 588 detects a match, the network 200 has not been properly trained and is indicated. For example, the output criteria 532 may not be possible. (e.g., an error). Negative requirement testing can be used to correct the error in some embodiments. If the compare circuit 586 and the compare circuit 588 both do not detect a match, the network 200 has not been properly trained and training of the neural network 200 is performed with respect to the criteria 542 and the criteria 544 in some embodiments. New training vectors related to proof failures provided by the testing systems 400 and 500 can be used to retrain the networks 200 and 340. in some embodiments.

Figure 8:
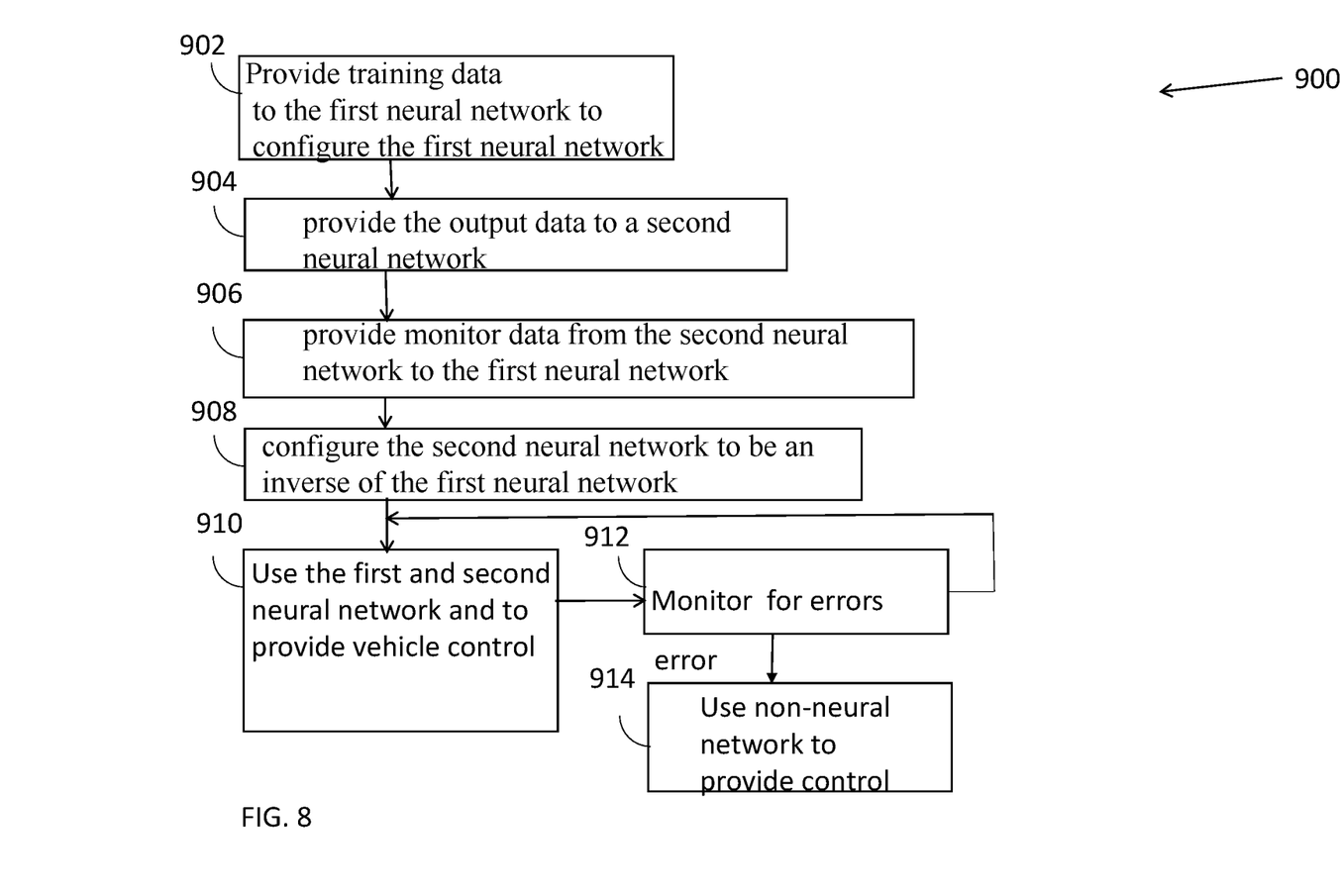
FIG. 8 is a flow diagram of an exemplary embodiment of operations using the aircraft control systems illustrated in FIGS. 2 and 3 according to the inventive concepts disclosed herein.

Referring now to FIG. 8, a flow of operations is used with the neural networks 66, 166, 68 and 168 in some embodiments. In an operation 902, training data is provided to the neural network 66 and the neural network 66 is configured. After the operation 904, the neural network is frozen and the output data from the neural network 66 responding to input data is provided to the neural network 68 in an operation 906. The neural network 68 is trained using the input data and the output data so that the neural network 68 provides monitor data (the input data) in response to the output data in an operation 908.

At an operation 910, the neural networks 66 and 68 are used in the control systems 50 and 150 (FIGS. 2 and 3). At an operation 912, the operation of the neural networks 66 and 68 are monitored for errors (e.g., out of line with training specifications). At an operation 914, a non-neural network is used in the control systems 50 and 150 if an error is determined.

As will be appreciated from the above, systems and methods for an avionics graphics interface according to embodiments of the inventive concepts disclosed herein may improve operation of autonomous vehicles, including control systems and electronics of autonomous vehicles, by enabling autonomous vehicles to provide a shared mental model at a high level of semantic understanding to a human operator, and to perform maneuvers in a manner consistent with how a vehicle controlled by a human operator would behave.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system for controlling a vehicle, comprising:
a sensor interface for receiving one or more sensor inputs;
a first neural network configured to receive the sensor inputs and provide one or more control signals for controlling the vehicle;
a second neural network configured to receive the control signals and provide one or more monitor signals, the second neural network an inverse neural network to the first neural network such that a disagreement between the one or more monitor signals and the one or more sensor inputs may indicate an improper operation of the first neural network;
and
a monitor configured to receive the sensor inputs and the monitor signals and provide a first signal related to a proper operation of the first neural network.

2. The system of claim 1, wherein the monitor is configured to compare the sensor inputs and the monitor signals and provides the first signal when the sensor inputs and the monitor signals match.

3. The system of claim 2, wherein the monitor is configured to compare the sensor inputs and the monitor signals and provides the first signal when the sensor inputs and the monitor signals do not match and the first signal indicates that the first neural network has not been trained for the sensor inputs.

4. The system of claim 1, wherein the second neural network is provided by pairing a frozen instance of the first neural network such that the monitor signals correspond to the sensor inputs.

5. The system of claim 1, further comprising:
a secondary control system configured to control the vehicle when the first signal indicates that the first neural network has not been trained for the sensor inputs.

6. The system of claim 5, wherein the control signals comprise at least one of a movement of a platform, or an electromagnetic transmission from the platform.

7. The system of claim 1, wherein the control signals are based on a relative navigation control model.

8. The system of claim 1, wherein the control signals are based on maneuver data from at least one of a simulation of piloting the vehicle, a control system of the vehicle, or a navigation system of the vehicle.

9. The system of claim 1, wherein the sensor inputs include position inputs.

10. A vehicle, comprising:
a first interface configured to receive an input condition;
a second interface configured to receive a control instruction indicating a maneuver command;
and
a control circuit comprising:
a first neural network configured to receive the input condition and provide the control instruction for controlling the vehicle;
a second neural network configured to receive the control instruction and provide a monitor condition, the second neural network an inverse neural network to the first neural network such that a disagreement between the monitor condition and the input condition may indicate an improper operation of the first neural network;
and
a monitor configured to receive the monitor condition and to provide a first signal related to a proper operation of the first neural network in response to the monitor condition or a second condition provided in response to the monitor condition.

11. The vehicle of claim 10, wherein the input condition is received from at least one of an image capture device, a radar detector, or a navigation system of an aircraft.

12. The vehicle of claim 11, wherein the input condition includes a relative orientation based on at least one remote vehicle.

13. The vehicle of claim 10, wherein the first neural network is configured by artificial intelligence training using predetermined input conditions and a plurality of predetermined control instructions associated with the predetermined input conditions.

14. The vehicle of claim 13, wherein the control circuit further comprises a third neural network configured to receive the monitor condition and provide the second condition,
and
wherein the monitor is configured to receive the second condition and provides the first signal related the proper operation at least in part in response to a comparison of the second condition and the input condition.

15. The vehicle of claim 10, wherein the vehicle further comprises an autopilot system, and the control circuit is configured to control operation of the vehicle using the autopilot system.

16. The vehicle of claim 10, wherein the control instruction is configured to cause the vehicle to follow a path of movement.

17. A method of training a neural network-based vehicle control system, the training method comprising:
providing input data to a first neural network to configure the first neural network to provide output data for vehicle control in response to the input data;
providing the output data to a second neural network;
providing monitor data from the second neural network to the first neural network after the first neural network has been configured, the monitor data being provided by the second neural network in response to the output data;
configuring the second neural network to be an inverse of the first neural network using the monitor data and the input.

18. The method of claim 17, further comprising using the first neural network and the second neural network in the neural network-based vehicle control system.

19. The method of claim 18, wherein the neural network-based vehicle control system comprises a maneuver controller, and the input data comprises historical input conditions.

* * * * *